United States Patent
Graves et al.

(10) Patent No.: US 12,474,202 B2
(45) Date of Patent: Nov. 18, 2025

(54) OPTICAL FIBER-BASED SENSING MEMBRANE

(71) Applicant: VIAVI SOLUTIONS INC., Chandler, AZ (US)

(72) Inventors: Jeffery Stephen Graves, Oxford Station (CA); Vincent Lecoeuche, Tarentaise (FR); Andre Champavere, Saint-Bonnet les Oules (FR)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 18/671,411

(22) Filed: May 22, 2024

(65) Prior Publication Data

US 2024/0310208 A1    Sep. 19, 2024

Related U.S. Application Data

(63) Continuation of application No. 17/718,416, filed on Apr. 12, 2022, now Pat. No. 12,031,859.

(30) Foreign Application Priority Data

Apr. 16, 2021 (EP) ..................... 21305505
Apr. 16, 2021 (EP) ..................... 21305506

(51) Int. Cl.
*G01H 9/00*    (2006.01)
*B60L 58/18*    (2019.01)
(Continued)

(52) U.S. Cl.
CPC .............. *G01H 9/004* (2013.01); *B60L 58/18* (2019.02); *G01D 21/02* (2013.01); *G01K 11/32* (2013.01);
(Continued)

(58) Field of Classification Search
CPC ......... G01H 9/004; B60L 58/18; B60L 50/64; B60L 50/66; B60L 2240/545;
(Continued)

(56) References Cited

U.S. PATENT DOCUMENTS 10,276,901 B2 * 4/2019 Yao .................. H01M 10/4257
2004/0201361 A1   10/2004 Koh et al.
(Continued)

FOREIGN PATENT DOCUMENTS

CN    1839301 A    9/2006
CN    101750057 A    6/2010
(Continued)

OTHER PUBLICATIONS

Bel, "Fiber Flex Optical Circuits", STRATOS Optical Technologies, downloaded from the Internet on May 27, 2022, 3 pages.
(Continued)

*Primary Examiner* — John Bedtelyon
(74) *Attorney, Agent, or Firm* — Mannava & Kang, P.C.

(57) ABSTRACT

An optical fiber-based sensing membrane includes at least one optical fiber, and a substrate. The at least one optical fiber is integrated in the substrate. The substrate includes a thickness and a material property that are specified to ascertain, via the at least one optical fiber and for a device that is contiguously engaged with a surface of the substrate, includes the substrate embedded in the device, or includes the surface of the substrate at a predetermined distance from the device, a thermal property or a mechanical property associated with the device, or a radiation level associated with a device environment.

20 Claims, 12 Drawing Sheets

(51) Int. Cl.
  *G01D 21/02* (2006.01)
  *G01K 11/32* (2021.01)
  *G01K 11/3206* (2021.01)
  *G01K 11/322* (2021.01)
  *G01K 11/324* (2021.01)
  *G01K 15/00* (2006.01)
  *G01L 1/24* (2006.01)
  *G01L 25/00* (2006.01)
  *G02B 6/12* (2006.01)
  *G02B 6/13* (2006.01)

(52) U.S. Cl.
  CPC ........ *G01K 11/3206* (2013.01); *G01K 11/322* (2021.01); *G01K 11/324* (2021.01); *G01K 15/005* (2013.01); *G01L 1/243* (2013.01); *G02B 6/13* (2013.01); *G01L 25/00* (2013.01); *G02B 2006/12138* (2013.01)

(58) Field of Classification Search
  CPC .......................... B60L 2250/10; G01D 21/02; G01D 5/35364; G01D 5/35377; G01D 5/35374; G01D 5/35361; G01K 11/32; G01K 11/3206; G01K 11/322; G01K 11/324; G01K 15/005; G01K 2205/00; G01K 1/14; G01L 1/243; G01L 25/00; G01L 1/242; G02B 6/13; G02B 2006/12138; Y02E 60/10; H01M 2220/20; H01M 10/48; H01M 10/486; G01M 11/086; G01B 11/18
  See application file for complete search history.

(56) References Cited

U.S. PATENT DOCUMENTS

| | | |
|---|---|---|
| 2009/0115607 A1 | 5/2009 | Beinhocker |
| 2014/0203783 A1 | 7/2014 | Kiesel et al. |
| 2015/0340744 A1 | 11/2015 | Knobloch et al. |
| 2017/0011667 A1 | 1/2017 | Sanchez et al. |
| 2017/0033414 A1 | 2/2017 | Ganguli et al. |
| 2017/0129361 A1 | 5/2017 | Scaringe |
| 2017/0248462 A1 | 8/2017 | Farhadiroushan et al. |
| 2018/0321325 A1 | 11/2018 | Fortier et al. |
| 2018/0364115 A1 | 12/2018 | Brown et al. |
| 2019/0006157 A1 | 1/2019 | O'Banion et al. |
| 2019/0100105 A1 | 4/2019 | Liu et al. |
| 2021/0031650 A1 | 2/2021 | Reeves |
| 2022/0311060 A1 | 9/2022 | Wang et al. |
| 2022/0332217 A1 | 10/2022 | Khaykin et al. |
| 2024/0310207 A1 | 9/2024 | Cuenot et al. |

FOREIGN PATENT DOCUMENTS

| | | |
|---|---|---|
| CN | 102292622 A | 12/2011 |
| CN | 102947678 A | 2/2013 |
| CN | 107817286 A | 3/2018 |
| CN | 108718534 A | 10/2018 |
| CN | 108749607 A | 11/2018 |
| CN | 109457902 A | 3/2019 |
| CN | 110285768 A | 9/2019 |
| CN | 110633486 A | 12/2019 |
| CN | 111102934 B | 3/2021 |
| DE | 102020105308 A1 | 11/2020 |
| EP | 2187472 A2 | 5/2010 |
| EP | 2672234 A1 | 12/2013 |
| EP | 2928006 A1 | 10/2015 |
| EP | 2975366 A1 | 1/2016 |
| EP | 2978043 A1 | 1/2016 |
| EP | 3525279 A1 | 8/2019 |
| WO | 2017040525 A1 | 3/2017 |

OTHER PUBLICATIONS

Bosboom et al., "Ribbon Tapes, Shape Sensors, and Hardware", Conference Paper—Sep. 2015, Conference: Smart Intelligent Aircraft Structures (SARISTU): Proceedings of the Final Project ConferenceAt: pp. 349-406vol. Part IV.

Ferreira da Silva et al., "Development of Skin-Foils With Embedded Optical Fiber Sensors", Semana de Engenharia 2010, 8 pages.

General Wire Products, Inc., "Comparison Chart of Typical Insulation Materials", downloaded on the Internet on May 27, 2022, 6 pages.

Han et al., "Multi-Scale Low-Entropy Method for Optimizing the Processing Parameters during Automated Fiber Placement", Materials 2017, 10, 1024, Sep. 3, 2017, 18 pages.

Long et al., "Stability of amorphous-Silicon TFTs deposited on clear plastic substrates at 250° C to 280° C", Article in IEEE Electron Device Letters, vol. 27, NP. 2, Feb. 2006, pp. 111-113.

TE connectivity, "High Density Versatile Optical Flex Circuit Cable Assemblies", downloaded on the Internet on May 7, 27, 2022, 2 pages.

English summary of Office Action for China Application No. CN2022104051789, mailed Mar. 28, 2025, 14 pages.

Jun Deng et al., "Fire identification and linkage control", Safety Science and Engineering, China Machine Press, Dec. 2019, 13 pages with Machine English translation.

European Patent Office, "The extended European Search report for Application No. EP 25172952.1-1001", dated Aug. 11, 2025, 11 pages.

* cited by examiner

US 12,474,202 B2

OPTICAL FIBER-BASED SENSING MEMBRANE

PRIORITY

This application is a Continuation of commonly assigned and co-pending U.S. patent application Ser. No. 17/718,416, filed Apr. 12, 2022, which claims priority to European Patent Application No. EP21305505.6, filed Apr. 16, 2021, titled "OPTICAL FIBER-BASED SENSING MEMBRANE LAYOUT", and European Patent Application No. EP21305506.4, filed Apr. 16, 2021, titled "OPTICAL FIBER-BASED SENSING MEMBRANE", the disclosures of which are hereby incorporated by reference in their entireties.

BACKGROUND

Optical fibers may be utilized in various industries such as communications, medical, military, broadcast, etc., to transmit data and for other related applications. Examples of applications may include sensing of temperature, mechanical strain, vibrations, and/or radiation dosage by utilizing an optical fiber. In this regard, principles of Raman, Rayleigh, and/or Brillouin scattering may be implemented for sensing of the temperature, mechanical strain, vibrations, and/or radiation dosage.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
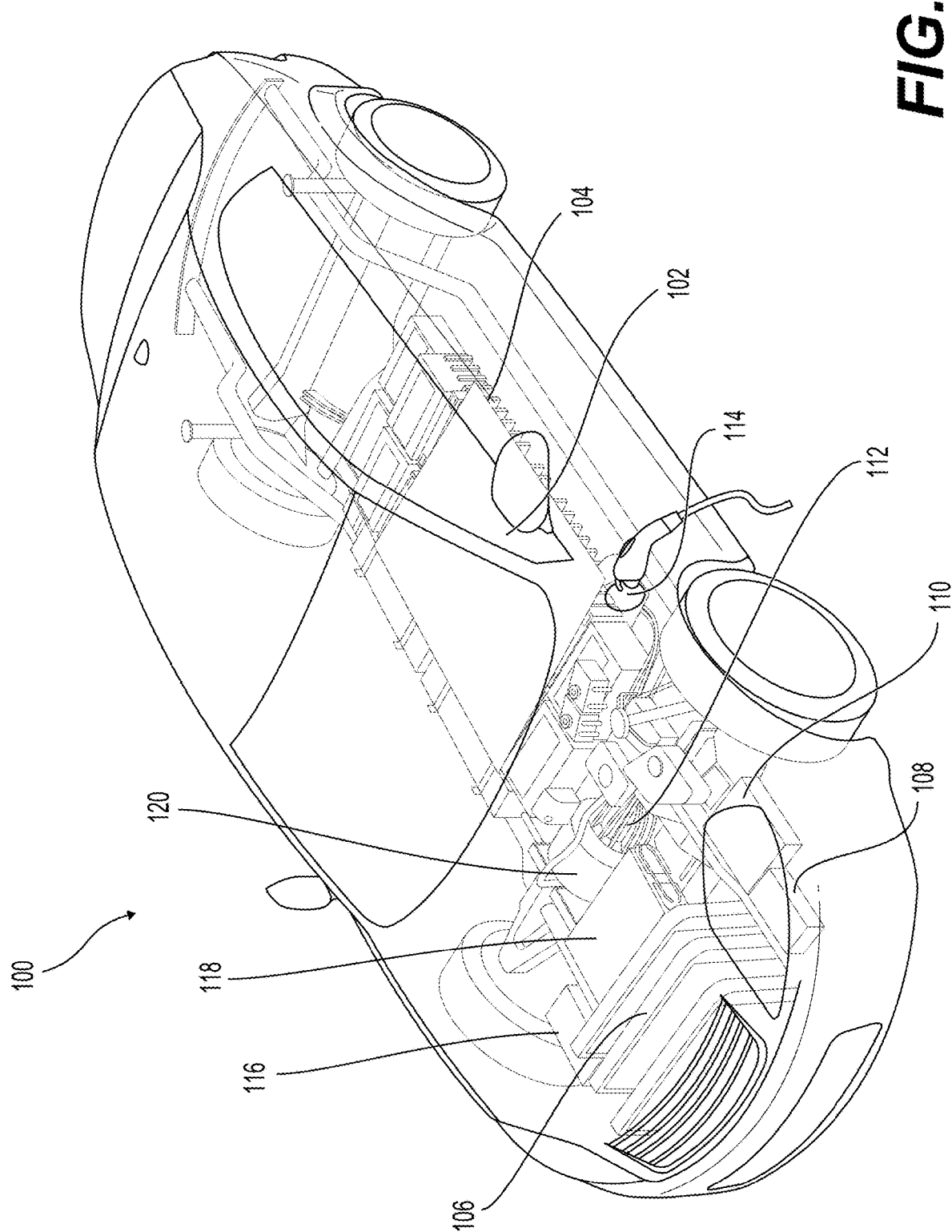
FIG. 1 illustrates an electric vehicle including an optical fiber-based sensing membrane, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples disclosed herein, the optical fiber-based sensing membrane may include at least one optical fiber, and a flexible substrate. The at least one optical fiber may be integrated in the flexible substrate. The flexible substrate may include a thickness and a material property that are specified to ascertain, via the at least one optical fiber and for a device that is contiguously engaged with a surface of the flexible substrate, includes the flexible substrate embedded in the device, or includes the surface of the flexible substrate at a predetermined distance from the device, a thermal and/or a mechanical property associated with the device. Examples of mechanical properties may include strain, vibration, and other such properties. The device may include, for example, a battery pack of an electric vehicle, or any other type of flat or curved structure that is to be monitored. Applications may include and not be limited to the monitoring of an energy storage plant based on batteries, monitoring of a nuclear power plant, and monitoring of defense equipment. Yet further, the substrate may be flexible or rigid. For example, with respect to a surface application of the sensing membrane on a device or an embedded application of the sensing membrane in a device, the optical fiber may be embedded in a rigid sensing membrane formed of a rigid substrate. According to another example, with respect to an optical fiber integrated in a molded part of a device such as a battery pack, the optical fiber may be embedded in a rigid sensing membrane formed of a rigid substrate.

With respect to fiber sensing generally, in some applications, an optical fiber may be utilized to monitor thermal and/or mechanical properties of a device. The device as utilized herein may be any type of machine, component, structure, etc., that is to be monitored. For example, for a device such as an electric vehicle battery pack that includes a plurality of battery cells, an optical fiber may be utilized to monitor thermal and/or mechanical properties of the battery pack. In this regard, embedding of an optical fiber directly into the device may not be feasible due to technical challenges related, for example, to laying, coiling, and/or attaching optical connectors each time an independent element (e.g., battery cell of the battery pack) of the device needs to be addressed.

In order to address at least the aforementioned technical challenges, the optical fiber-based sensing membrane disclosed herein may include at least one optical fiber integrated in a flexible substrate. According to examples disclosed herein, the optical fiber-based sensing membrane may utilize, for example, a Polyimide flex, or other such materials. In this regard, the optical fiber-based sensing membrane may also house components such as electrical tracks, sensors, and optical connectors to reduce an electrical harness associated with utilization of the optical fiber-based sensing membrane.

According to examples disclosed herein, the optical fiber-based sensing membrane may include various types of layouts. For example, the layouts may include single or multiple optical fibers, single-end or dual-end access to the optical fibers, and other types of layouts. A complete and perfect path folding may be achieved, for example, with a multicore fiber and a loopback optical element connecting the two cores in series at a distal end from an interrogator.

According to examples disclosed herein, the optical fiber-based sensing membrane may include fiber loops to compensate for spatial resolution. Alternatively or additionally, the optical fiber-based sensing membrane may include path folding or partial path folding to compensate for optical fiber losses.

According to examples disclosed herein, the optical fiber-based sensing membrane may sense various types of parameters associated with a device. For example, the parameters may include temperature, strain, vibration, radiation dosage and other such parameters.

According to examples disclosed herein, the optical fiber-based sensing membrane may enhance the ability to detect a parameter that may be very localized by conveying that parameter to the fiber location. For example, in the case of detection of a local hotspot with the fiber loop configuration, a thermal diffuser may be applied to transfer the heat from areas not covered by the fiber. Depending on application constraints, a copper diffuser or a thermally conductive electrically insulating material may be used.

According to examples disclosed herein, different types of parameters sensed by the optical fiber-based sensing membrane may be used to generate different types of notifications or alarms. For example, a temperature variation that exceeds a specified temperature threshold may be used to generate a first type of notification or alarm. Similarly, a strain variation that exceeds a specified strain threshold (e.g., due to damage to the device) may be used to generate a second type of notification or alarm. The occurrence of thermal runaway of a battery element may also be classified through the analysis of the temporal evolution and in particular the rate of change of temperature or strain.

According to examples disclosed herein, a number of elements of the device being monitored may be scaled without the need to add optical connections. For example, a length or configuration of the optical fiber-based sensing membrane may be modified as needed to account for an increased or a decreased number of elements being monitored. In this regard, one or more optical connections may be utilized for an optical fiber-based sensing membrane, and a size of the optical fiber-based sensing membrane may be increased or decreased as needed to address a plurality of devices, without the need to include an optical connection for each device. Thus a single optical connection may be implemented for a plurality of devices being monitored, thus reducing the potential of a fault associated with operation of the optical fiber-based sensing membrane.

According to examples disclosed herein, the devices that are being monitored may remain accessible, for example, for maintenance and other such activities, without being restricted by optics associated with the optical fiber-based sensing membrane. For example, the optical fiber-based sensing membrane may be configured to address a specified area of the device being monitored, leaving other areas of the device accessible for maintenance and other activities.

According to examples disclosed herein, the optical fiber-based sensing membrane may itself remain accessible, for example, for maintenance and other such activities. In this regard, the optical fiber-based sensing membrane may be configured to address a specified area of the device being monitored, leaving other areas of the optical fiber-based sensing membrane accessible for maintenance and other activities.

According to examples disclosed herein, the optical fiber-based sensing membrane may be implemented in a relatively harsh environment. For example, the environment of the optical fiber-based sensing membrane may include relatively significant temperature variations on the order of −40° C. to 140° C. The material used for the sensing membrane may supersede the standard coating of optical fibers and continue to protect the optical fiber mechanically beyond the melting point of coating.

According to examples disclosed herein, the optical fiber-based sensing membrane may include a two-dimensional or a three-dimensional configuration. The two-dimensional configuration may include a plurality of optical fibers embedded in a substrate and configured as a two-dimensional plane structure to match a corresponding two-dimensional surface of a device that is to be monitored for temperature and/or strain variations, vibrations, and/or radiation dosage. The three-dimensional configuration may include a plurality of optical fibers embedded in a substrate and configured as a three-dimensional structure to match a corresponding three-dimensional shape of a device that is to be monitored for temperature and/or strain variations, vibrations, and/or radiation dosage. Depending on the dimensions of the structure to be monitored, the budget loss of the fiber system and the dynamic range of the interrogator, distances may be covered in a single chain, or with multiple fibers in parallel that may be accessed sequentially from a single interrogator by means of an optical switch.

According to examples disclosed herein, the optical fiber-based sensing membrane may be utilized with an optical time-domain reflectometer (OTDR) to determine temperature, strain and/or radiation dosage associated with a device. The OTDR may represent an optoelectronic instrument used to characterize an optical fiber, for example, of the optical fiber-based sensing membrane. The OTDR may inject a series of optical pulses into an optical fiber under test. Based on the injected optical pulses, the OTDR may extract, from the same end of the optical fiber in which the optical pulses are injected, light that is scattered or reflected back from points along the optical fiber. The scattered or reflected light that is gathered back may be used to characterize the optical fiber. For example, the scattered or reflected light that is gathered back may be used to detect, locate, and measure events at any location of the optical fiber. The events may include faults at any location of the optical fiber. Other types of features that may be measured by the OTDR include attenuation uniformity and attenuation rate, segment length, and location and insertion loss of connectors and splices.

The OTDR may be used to determine both Brillouin and Rayleigh traces for an optical fiber, for example, of the optical fiber-based sensing membrane. In one example, in an initial acquisition, Brillouin frequency shift and Brillouin power may be used to implement an absolute referencing of a Rayleigh reference trace (or traces). The Rayleigh reference trace may represent a reference point for subsequent measurements of the Rayleigh frequency shift. In this regard, the absolute referencing of the Rayleigh reference trace (or traces) may then be used to determine temperature and/or strain associated with an optical fiber by using the Brillouin frequency shift and the Rayleigh frequency shift in subsequent acquisitions.

According to examples disclosed herein, the optical fiber-based sensing membrane may be utilized with the OTDR to determine, based on distributed measurement, temperature, strain, and/or vibrations associated with a device, such as a battery pack.

According to examples disclosed herein, an optical fiber-based sensing membrane may include at least one optical fiber, and a substrate. The at least one optical fiber may be integrated in the substrate, and the substrate may include a thickness and a material property. The thickness and the material property may be specified to ascertain, via the at least one optical fiber and for a device that is contiguously engaged with a surface of the substrate, includes the substrate embedded in the device, or includes the surface of the substrate at a predetermined distance from the device, a thermal and/or a mechanical property associated with the device, or a radiation level associated with a device environment.

For the optical fiber-based sensing membrane described above, the device may include a battery pack of an electric vehicle.

For the optical fiber-based sensing membrane described above, the mechanical property may include strain and/or vibration.

For the optical fiber-based sensing membrane described above, the substrate may include Polyimide.

For the optical fiber-based sensing membrane described above, the at least one optical fiber and the substrate may include a combined weight of between approximately 200 $g/m^2$ to 500 $g/m^2$.

For the optical fiber-based sensing membrane described above, the at least one optical fiber and the substrate may include a combined thickness of less than approximately 0.5 mm.

For the optical fiber-based sensing membrane described above, the at least one optical fiber may include a single optical fiber that is looped.

For the optical fiber-based sensing membrane described above, a thermal diffuser may transfer heat from an area of the device that is not monitored by the optical fiber-based sensing membrane to an area that is monitored by the optical fiber-based sensing membrane.

According to examples disclosed herein, an optical fiber-based sensing membrane may include at least one optical fiber, and a substrate. The at least one optical fiber may be integrated in the substrate, and the substrate may include a thickness and a material property. The thickness and the material property may be specified to ascertain, via the at least one optical fiber, a thermal and/or a mechanical property associated with a device.

For the optical fiber-based sensing membrane described above, the substrate including the at least one optical fiber may be formed as a ribbon to wrap around the device.

For the optical fiber-based sensing membrane described above, the substrate including the at least one optical fiber may be formed in a three-dimensional (3D) shape to at least partially encase the device.

According to examples disclosed herein, a method may include embedding an optical fiber-based sensing membrane in a device or contiguously engaging the optical fiber-based sensing membrane with the device. The optical fiber-based sensing membrane may include at least one optical fiber, and a substrate. The at least one optical fiber may be integrated in the substrate, and the substrate may include a thickness and a material property. The method may further include ascertaining, via the embedded or the contiguously-engaged optical fiber-based sensing membrane, a thermal and/or a mechanical property associated with the device.

For the method described above, the device may include a pouch cell module that includes at least one pouch that expands or contracts based on thermal changes in the pouch cell module. In this regard, ascertaining, via the embedded or the contiguously-engaged optical fiber-based sensing membrane, the thermal and/or the mechanical property associated with the device may further include ascertaining, via the contiguously-engaged optical fiber-based sensing membrane, the mechanical property that includes strain based on expansion of the at least one pouch due to thermal changes associated with the device.

For the method described above, the device may include a pouch cell module that includes at least one plate that expands based on thermal changes in the pouch cell module. In this regard, ascertaining, via the embedded or the contiguously-engaged optical fiber-based sensing membrane, the thermal and/or the mechanical property associated with the device may further include ascertaining, via the contiguously-engaged optical fiber-based sensing membrane, the mechanical property that includes strain based on expansion of the at least one plate due to thermal changes associated with the device. The plate may include a curved profile.

For the method described above, the device may include a pouch cell module that includes at least one piston that moves based on thermal changes in the pouch cell module. In this regard, ascertaining, via the embedded or the contiguously-engaged optical fiber-based sensing membrane, the thermal and/or the mechanical property associated with the device may further include ascertaining, via the contiguously-engaged optical fiber-based sensing membrane, the mechanical property that includes strain based on movement of the at least one piston due to thermal changes associated with the device. In this regard, the mechanical property may include strain based on movement of the at least one piston resulting from expansion of an associated pouch due to thermal changes associated with the device.

For the method described above, the method may further include utilizing a thermal diffuser to transfer heat from an area of the device that is not monitored by the optical fiber-based sensing membrane to an area that is monitored by the optical fiber-based sensing membrane.

FIG. 1 illustrates an electric vehicle 100 including an optical fiber-based sensing membrane 102 (hereinafter referred to as "sensing membrane 102"), according to an example of the present disclosure. Referring to FIG. 1, the electric vehicle 100 may include the sensing membrane 102 disposed on a device, such as a battery pack 104.

The electric vehicle 100 may include other known components such as a thermal system 106 for cooling the vehicle, an auxiliary battery 108, an onboard battery charger 110, a vehicle transmission 112, a charge port 114 for the battery pack 104, a converter 116, a power electronics controller 118, and an electric traction motor 120.

Figure 2:
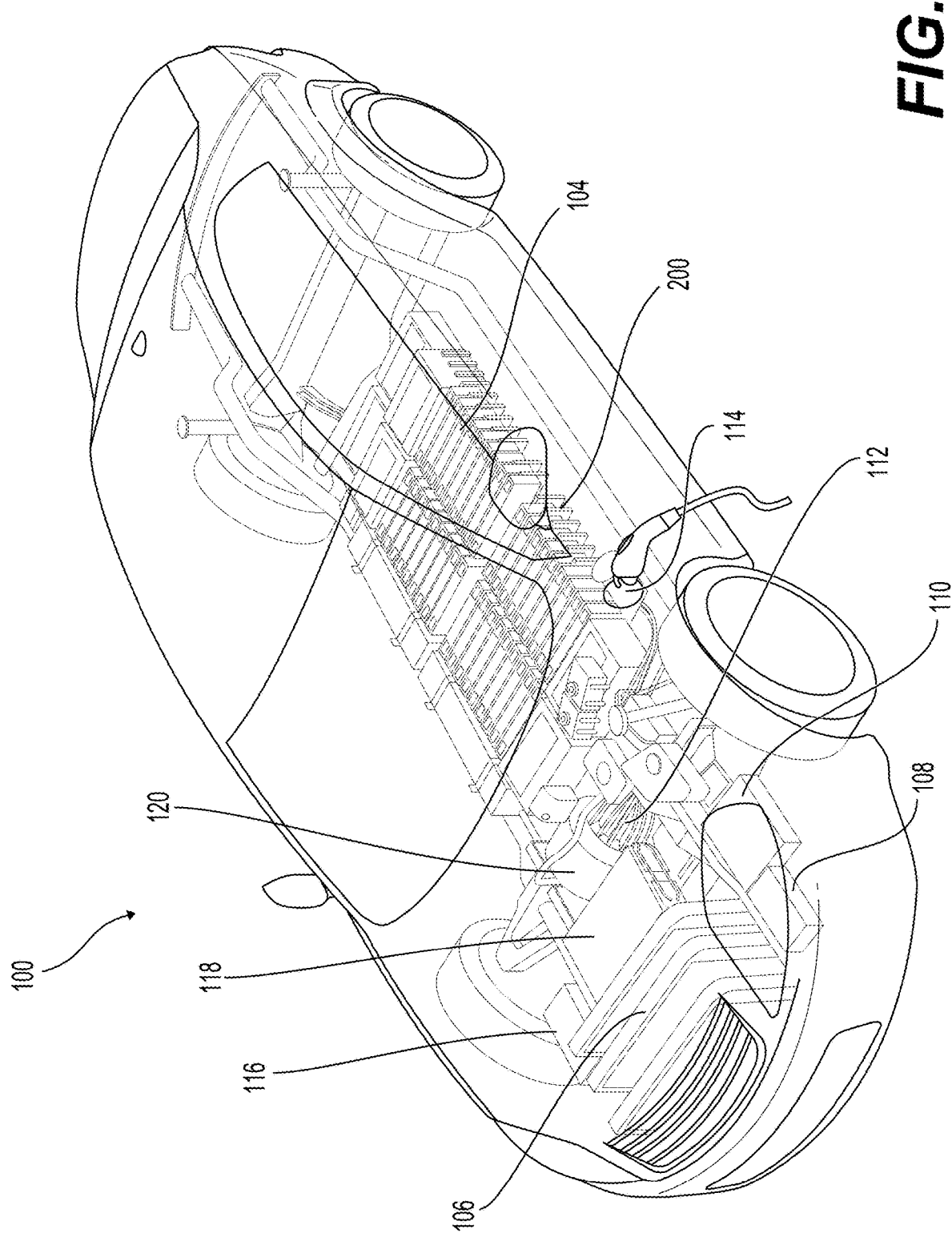
FIG. 2 illustrates the electric vehicle of FIG. 1, with the optical fiber-based sensing membrane removed, according to an example of the present disclosure.

FIG. 2 illustrates the electric vehicle 100 of FIG. 1, with the optical fiber-based sensing membrane 102 removed, according to an example of the present disclosure.

Referring to FIG. 2, the battery pack 104 is shown with the sensing membrane 102 removed. In this regard, the battery pack 104 may include, as shown, a plurality of battery cells 200. The sensing membrane 102 may be configured to sense thermal and/or strain variations, and/or vibrations associated with one, a few, or all of the battery cells 200 of the battery pack 104.

Figure 3:
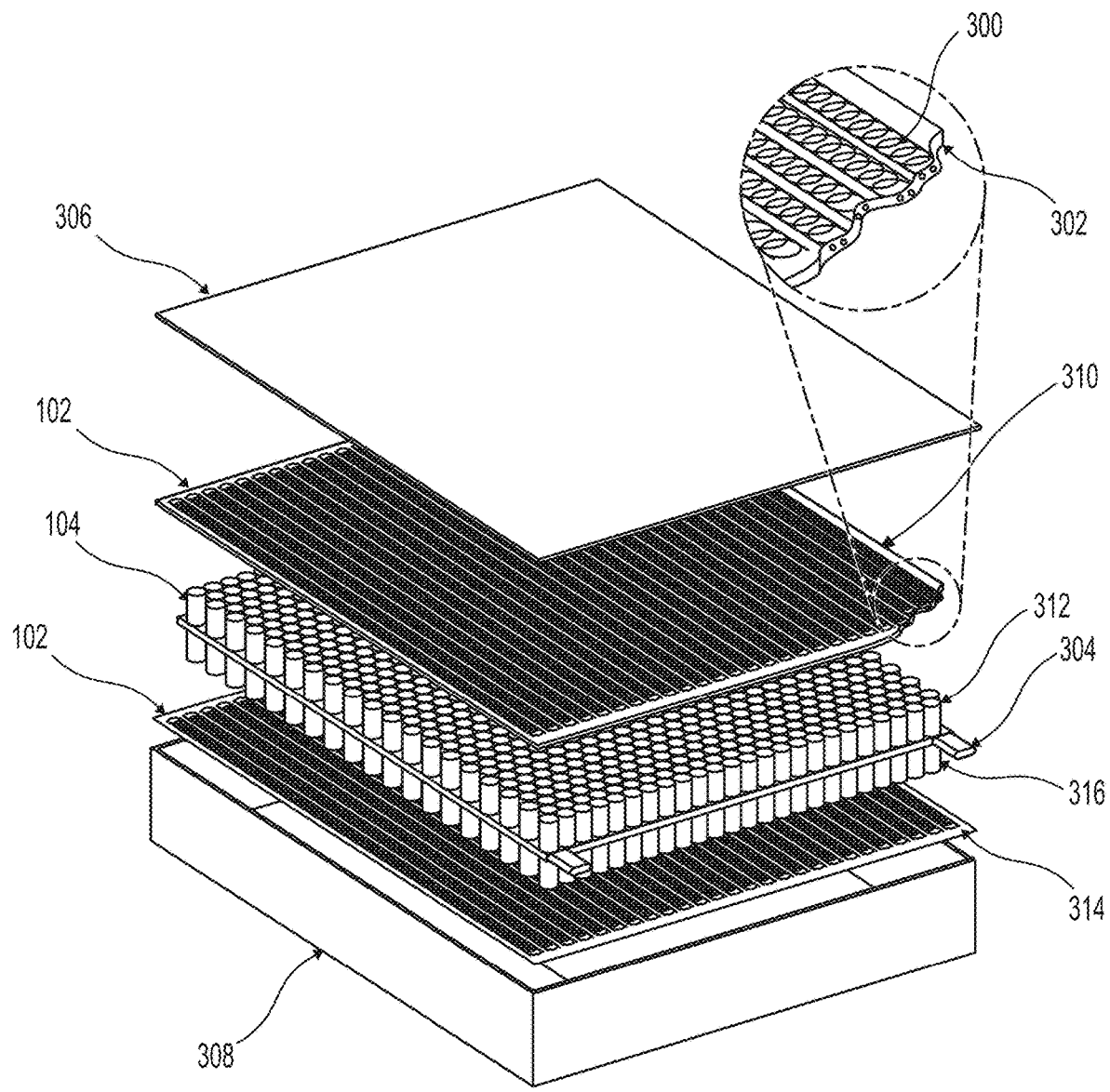
FIG. 3 illustrates a diagrammatic view illustrating the optical fiber-based sensing membrane of FIG. 1 in use, according to an example of the present disclosure.
Figure 3:
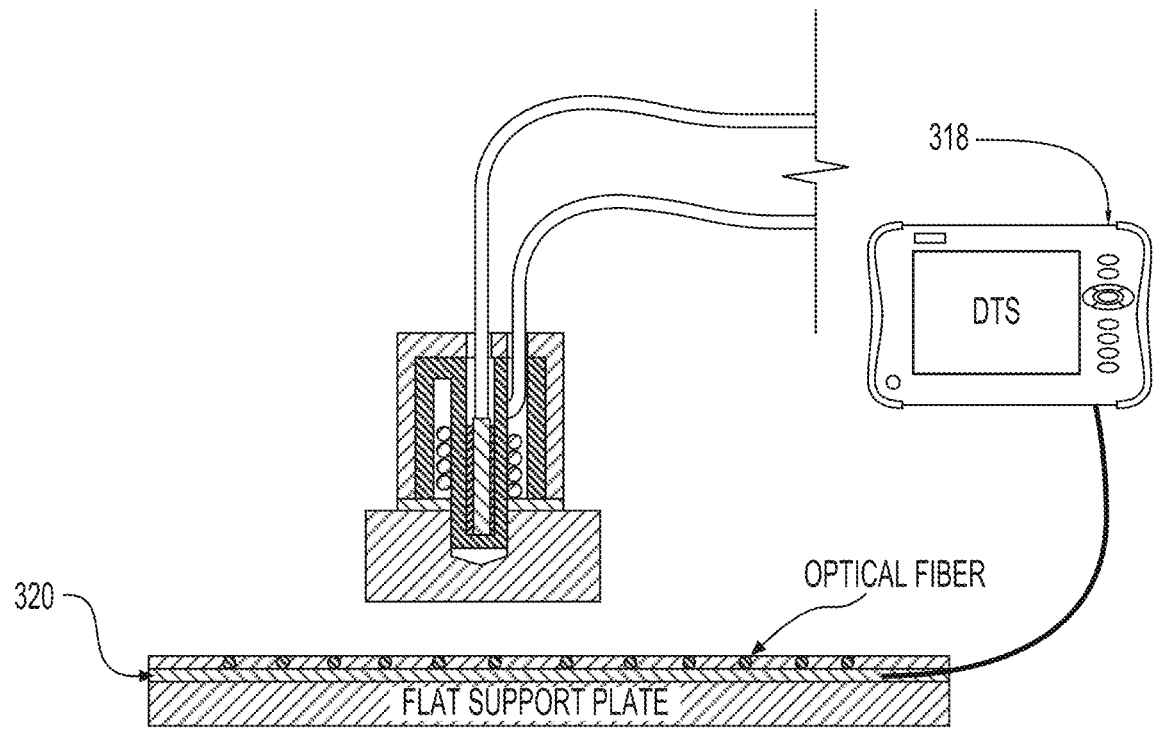
Figure 3:
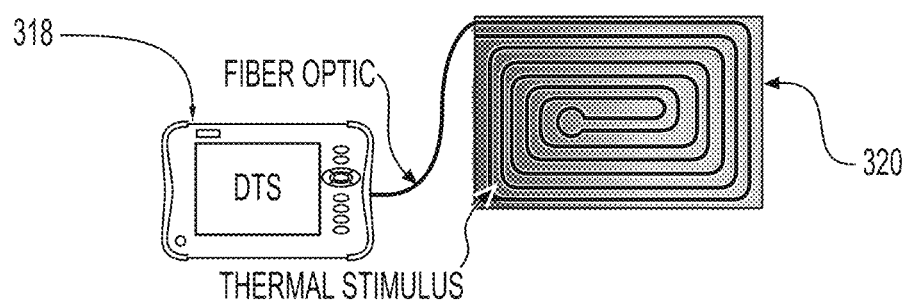

FIG. 3 illustrates a diagrammatic view illustrating the optical fiber-based sensing membrane 102 in use, according to an example of the present disclosure.

Referring to FIG. 3, the optical fiber-based sensing membrane 102 may include at least one optical fiber integrated in an adhesive substrate. In the example of FIG. 3, as shown in the enlarged view, a plurality of optical fibers 300 may be integrated in an adhesive substrate 302.

In the example of FIG. 3, sensing membranes may be disposed on upper and lower surfaces of the battery pack 104 in the orientation of FIG. 3. The battery pack 104 may include a plurality of battery cells. The battery cells may include, in the example shown, a cooling system 304 between upper and lower sets of battery cells in the orientation of FIG. 3. The upper and lower sensing membranes, and the battery pack 104 may be enclosed in an enclosure, with upper and lower layers 306 and 308 of the enclosure shown in the orientation of FIG. 3.

For the example of FIG. 3, the sensing membrane 102 at 310 may be used to sense thermal and/or strain variations, and/or vibrations of upper battery cells at 312, and the sensing membrane 102 at 314 may be used to sense thermal and/or strain variations, and/or vibrations of lower battery cells at 316.

The adhesive substrate may include Polyimide, or another such material. The Polyimide material may provide the requisite durability with respect to vibrations associated with the battery pack 104 and/or other components that may be engaged with the sensing membrane 102. Similarly, the Polyimide material may provide the requisite durability with respect to temperature variations associated with the battery pack 104 and/or other components, which may be on the order of −40° C. to 140° C., or include a greater range than −40° C. to 140° C. Further, the Polyimide material may provide the requisite flexibility associated with surface variations associated with the battery pack 104 and/or other components that may be engaged with the sensing membrane 102. The Polyimide material may also be transparent, and thus provide sufficient transmission of light into the optical fiber for detection of light or an anomaly (e.g., a high temperature event) associated with the battery pack 104.

The sensing membrane 102 may be of a light weight (e.g., 200-500 g/m$^2$). In this regard, the sensing membrane 102 may add minimal weight with respect to the device being monitored for thermal and/or strain variations, and/or vibrations.

The sensing membrane 102 may be approximately 0.5 mm, to thus minimize integration challenges with respect to the device being monitored for thermal and/or strain variations, and/or vibrations. In this regard, the optical fibers embedded in the sensing membrane 102 may be on the order of 0.25 mm in thickness. For the geometric patterns of optical fibers that include optical fiber crossings, such optical fibers may be treated after the sensing membrane is assembled, for example, by a combined action of pressure and temperature above the melting point of the optical fiber coating while the sensing membrane material is unaffected. Thus, the overall thickness of 0.5 mm may thus add minimal thickness associated with the battery pack 104. The same process may be applied for the purpose of reducing the micro-bends applied to the fiber at each fiber crossing. The accumulation of thousands of micro-bends may induce attenuation.

With continued reference to FIG. 3, one example of a test set-up to evaluate performances of distributed temperature sensing systems based on distributed temperature sensing interrogator (DTS) 318 (also referred to herein as distributed temperature sensor) and fiber sensing membrane 320 is shown, and may be utilized to sense temperature, but also strain variations using a distributed strain sensing interrogator in place of the DTS. In this regard, the distributed temperature sensing interrogator 318, which may include an OTDR, may be utilized with the various examples of the sensing membrane 102 as disclosed herein.

The sensing membrane 102 may provide for monitoring of an entire surface of the battery pack 104. In this regard, the sensing membrane 102 may be dimensioned to monitor a partial or the entire surface of the battery pack 104.

The sensing membrane 102 may be scalable to measure temperature and/or strain variations, and/or vibrations associated with a small groups of cells. For example, a plurality of sensing membranes may be utilized to measure temperature and/or strain variations, and/or vibrations associated with corresponding groups of cells.

The sensing membrane 102 may be similarly scalable to measure mechanical damage to the battery cells of the battery pack 104 and/or to the enclosure of the battery pack 104. In this regard, any mechanical damage to the battery cells and/or the enclosure that exceeds a specified amount may be ascertained by the sensing membrane 102 as a strain variation.

The sensing membrane 102 may be single-ended to include a single optical connector. In this regard, a single optical connector may be connected to a single optical fiber of the sensing membrane 102, where the single optical fiber may be configured in various patterns such as parallel with loop-backs, zig-zag, curved, etc., to cover an entire area of the sensing membrane 102.

Figure 4:
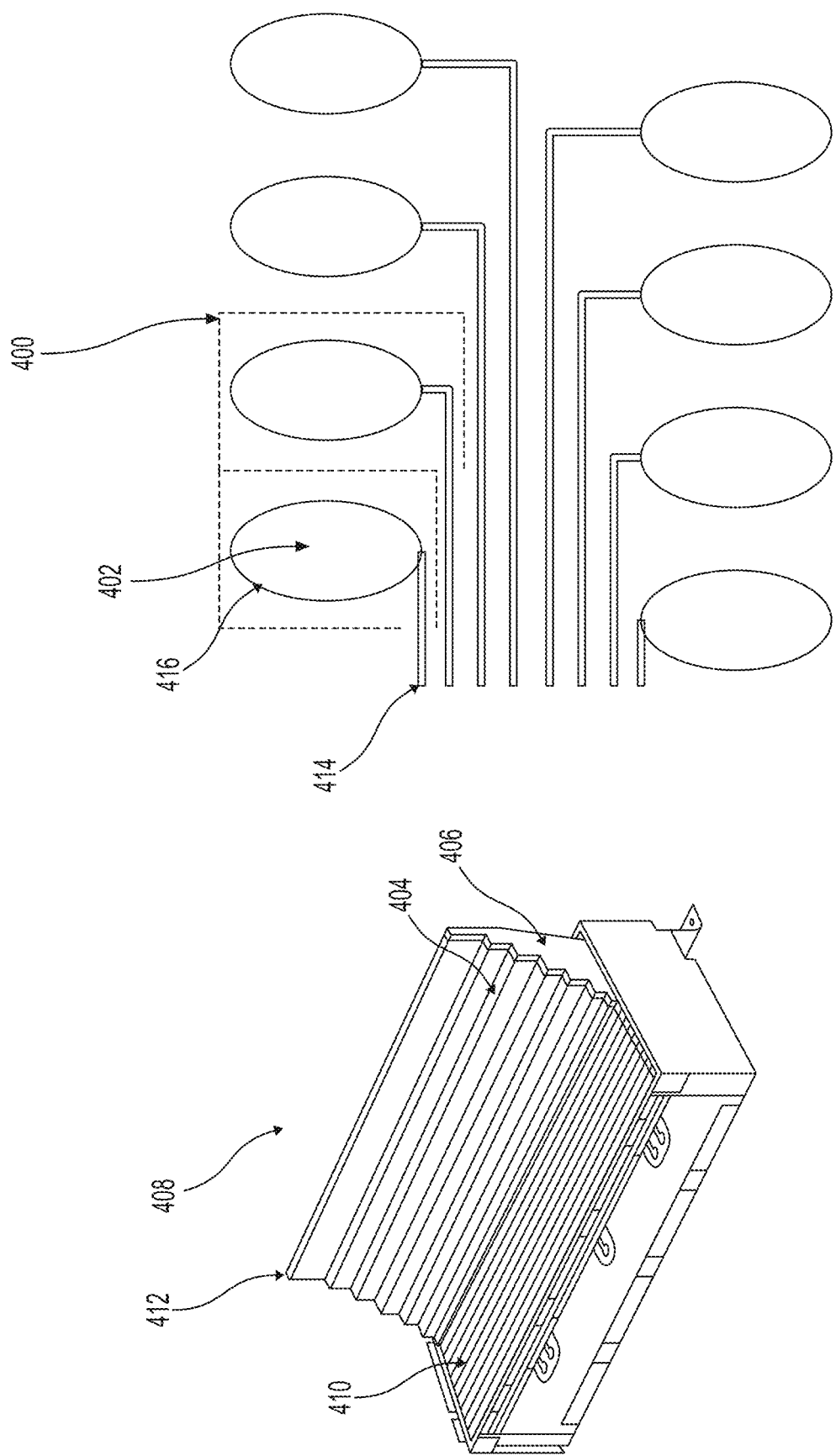
FIG. 4 illustrates a diagrammatic view of the optical fiber-based sensing membrane of FIG. 1 including a pre-cut membrane, according to an example of the present disclosure.

FIG. 4 illustrates a diagrammatic view of the optical fiber-based sensing membrane 102 including a pre-cut membrane, according to an example of the present disclosure.

Referring to FIG. 4, according to examples disclosed herein, the sensing membrane 102 may include, at one or multiple ends thereof, a plurality of pre-cut membranes 400. Each of the pre-cut membranes may include an adhesive center 402 that may be removably affixed to areas 404 or 406 of a battery 408. The battery 408 may be of a type used for electric vehicles, and may include a planar area 410 and a raised area 412. In the example of FIG. 4, the pre-cut membranes 400 may be staggered so that as the sensing membrane 102 is laid onto the battery 408, the adhesive centers are affixed to the areas, such as the areas 404 or 406. For example, the pre-cut membranes 400 may be staggered to facilitate attachment to a plurality of fibers 414 which are looped at 416. The fibers 414 may be interconnected to each other, for example, on the left hand side in the orientation of FIG. 4, so that each of the fibers 414 is interconnected to form the sensing membrane 102. In this regard, the entire battery 408 may be covered by a single fiber span including one optical connector. The sensing membrane 102 may include a relatively flat configuration to facilitate storage. Further, the relatively flat configuration may provide for maintenance of the modularity of the battery 408.

Figure 5:
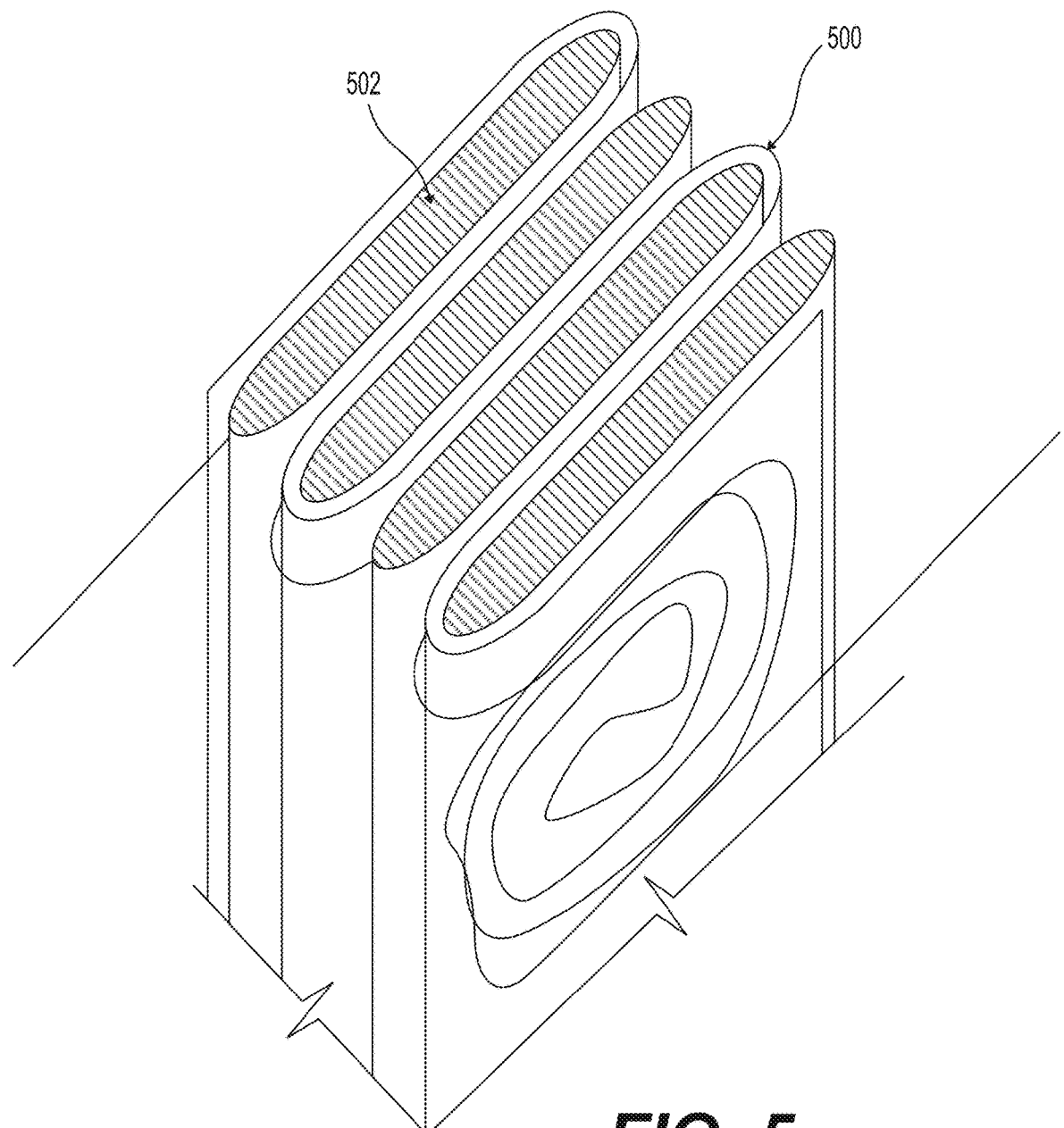
FIG. 5 illustrates a diagrammatic view of the optical fiber-based sensing membrane of FIG. 1 including a ribbon configuration, according to an example of the present disclosure.

FIG. 5 illustrates a diagrammatic view of the optical fiber-based sensing membrane 102 including a ribbon configuration, according to an example of the present disclosure.

Referring to FIG. 5, for a ribbon configuration 500, the optical fiber-based sensing membrane 102 may be wrapped around a battery 502 in zig-zag manner as shown. For example, a single ribbon may be wrapped around four batteries in zig-zag manner as shown.

Figure 6:
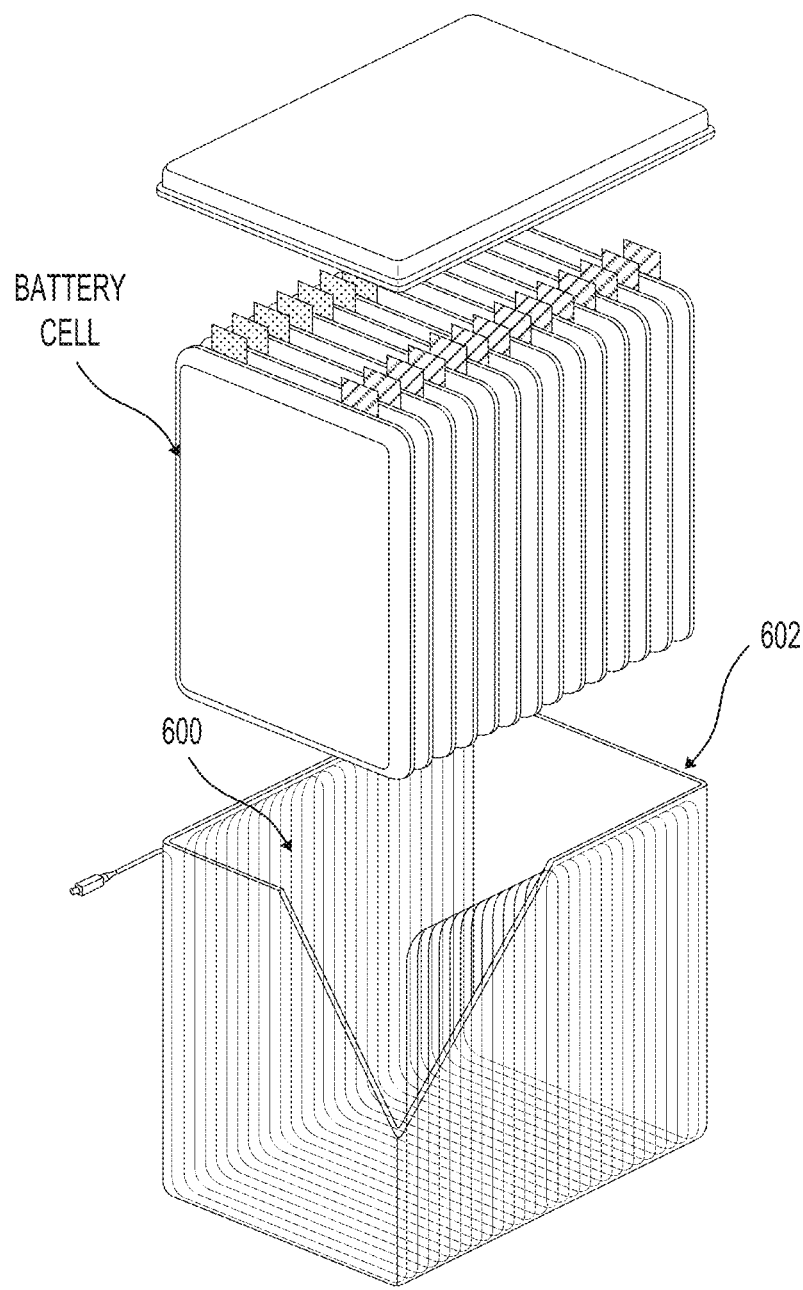
FIG. 6 illustrates a diagrammatic view of the optical fiber-based sensing membrane of FIG. 1 including a battery casing as a substrate, according to an example of the present disclosure.

FIG. 6 illustrates a diagrammatic view of the optical fiber-based sensing membrane 102 including a battery casing as a substrate, according to an example of the present disclosure.

Referring to FIG. 6, according to examples disclosed herein, the optical fiber-based sensing membrane 102 may utilize a battery casing as a substrate. In this regard, an optical fiber 600 may be adhered or laminated to a surface of a battery casing housing 602, irrespective of the material of the battery casing housing, or molded directly into the battery casing housing (in the case of a plastic or composite material of the battery casing housing).

Figure 7:
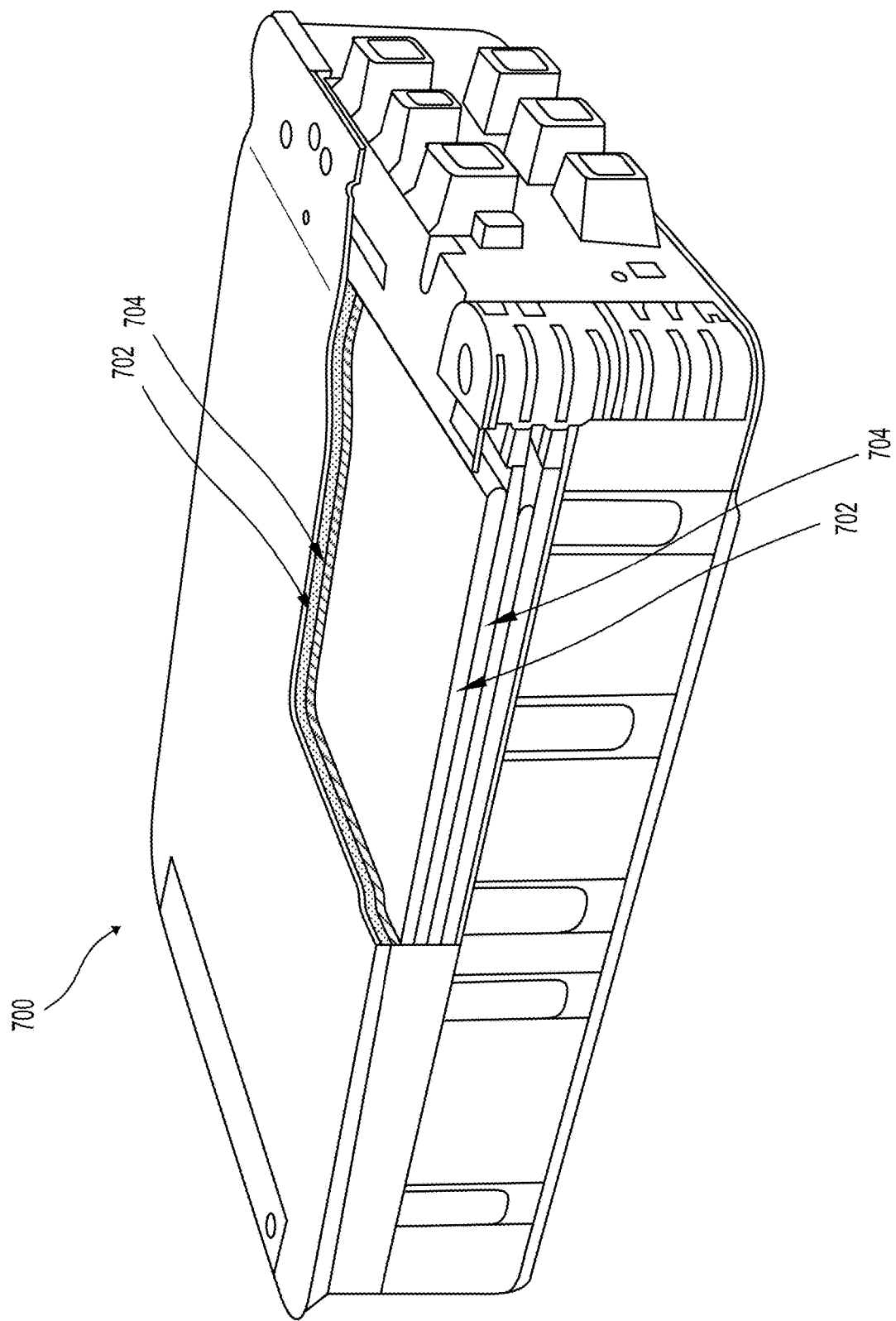
FIG. 7 illustrates an example of a pouch cell module, according to an example of the present disclosure.
Figure 8:
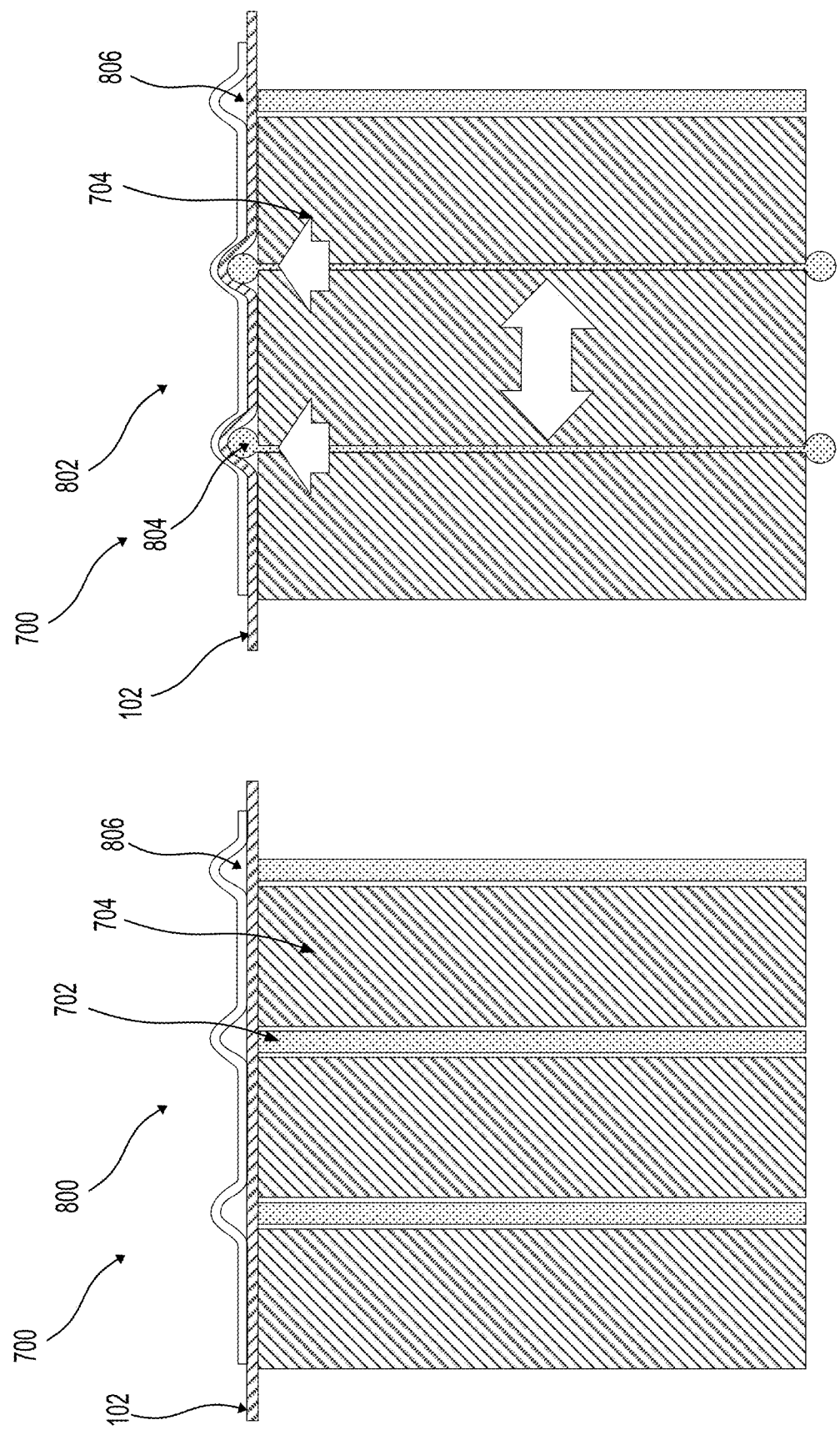
FIG. 8 illustrates normal and bulging states of the pouch cell module of FIG. 7, and detection of bulging of the pouch cell module by utilization of the optical fiber-based sensing membrane of FIG. 1 or an optical fiber, according to an example of the present disclosure.
Figure 9:
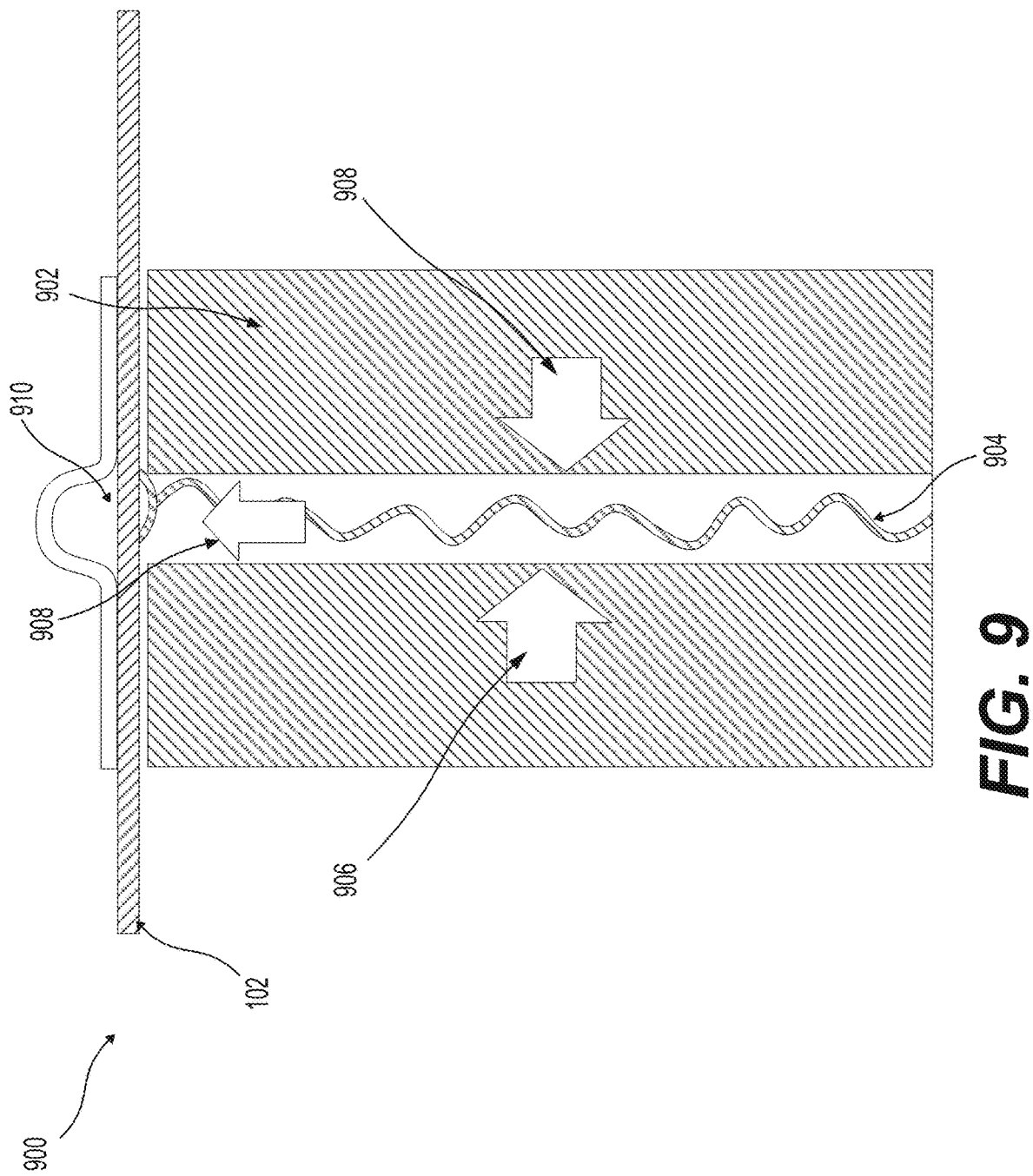
FIGS. 9 and 10 illustrate other examples of deformation of the pouch cell module, and detection of bulging of the pouch cell module by utilization of the optical fiber-based sensing membrane of FIG. 1 or an optical fiber, according to an example of the present disclosure.
Figure 10:
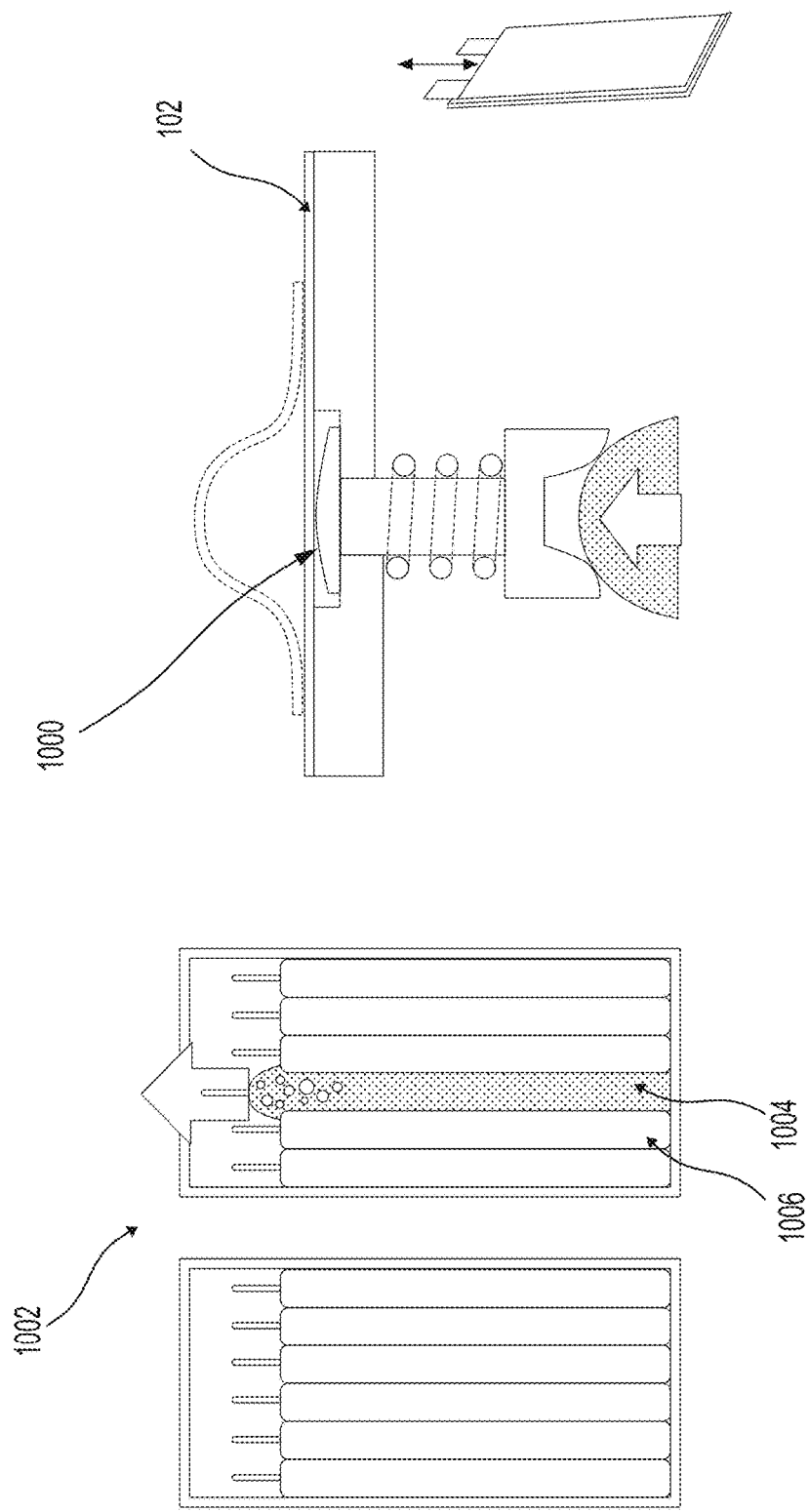

FIG. 7 illustrates an example of a pouch cell module, according to an example of the present disclosure. FIG. 8 illustrates normal and bulging states of the pouch cell module of FIG. 7, and detection of bulging of the pouch cell module by utilization of the sensing membrane 102 or an optical fiber, according to an example of the present disclosure. FIGS. 9 and 10 illustrate other examples of deformation of the pouch cell module, and detection of bulging of the pouch cell module by utilization of the sensing membrane 102 or an optical fiber, according to an example of the present disclosure.

Referring next to FIGS. 7-9, strain monitoring may allow for detection of the production of gases in a device, such as a battery cell, and more specifically, a pouch cell module. The associated swelling of the battery cell with inner pressure may result from a failure, and its early detection may prevent a subsequent thermal runaway. With respect to the sensing membrane 102, in one example, the optical fiber in the sensing membrane 102 or an optical fiber may not be integrated in the battery cell assembly process and further, in a device, such as a pouch cell module (avoiding the optical connections to get in and out of the pouch cell module). In this regard, the sensing membrane 102 (or an optical fiber itself as disclosed herein) may be utilized to detect pressure outside of a pouch cell module.

Referring to FIG. 7, free space may be available in some types of pouch cell modules, such as the pouch cell module 700, that are heat sealed and therefore narrower on three edges, and possibly in two orthogonal dimensions. In this regard, the sensing membrane 102 (or an optical fiber itself as disclosed herein) may be utilized to measure the pressure outside the pouch cell module 700. In one example, pouches 702 filled with a liquid may be placed in the free space of the pouch cell module 700 between pouch cells 704. In this regard, FIG. 7 shows a cutout view that illustrates pouches 702 (cutout and complete), and pouch cells 704 (cutout and complete), each of which alternate in the pouch cell module 700.

As shown in FIG. 8 that illustrates a normal state at 800 and a bulging state at 802 of the pouch cell module 700, the pouches may expand under the action of pressure and protrude, for example, at 804, outside the pouch cell module through a dedicated window 806 of the housing. In this regard, the sensing membrane 102 (or an optical fiber itself as disclosed herein) may be disposed at the dedicated window 806 to measure strain from expansion of a pouch.

In another example, as shown in FIG. 9, a pouch cell module 900 including pouch cells 902 may include a specifically profiled (e.g., curved) plate 904 placed in free space between the pouch cells 902. In this case, transverse pressure on the plate 904 in the direction of arrows 906 and 908 (e.g., due to thermal expansion of the pouch cells 902) may expand the plate 904 in a longitudinal direction at 908 so as to protrude outside the pouch cell module through a dedicated casing window 910. For the plate 904, an expansion on the order of 10% may be accessible to allow a movement in the centimeter scale. The sensing membrane 102 (or an optical fiber itself as disclosed herein) may be disposed at the dedicated window 910 to measure strain from expansion of the plate 904.

Referring to FIG. 10, the example of FIG. 10 may implement the principle that the battery-pouch alone may expand enough and actuate a piston 1000 or any mechanism that would protrude outside the pouch cell module 1002. A pouch 1004 may be optimized (e.g., include an enlarged area as shown) to enhance the expansion at the target location to actuate the expected movement and bending loss on the optical fiber of the sensing membrane 102 (or an optical fiber itself in place of the sensing membrane 102 as disclosed herein). Thus, when pouch cells 1006 expand, the pouch 1004 may similarly expand upwards in the orientation of FIG. 10 to push piston 1000 upwards, where the strain induced in the optical fiber of the sensing membrane 102 (or an optical fiber itself in place of the sensing membrane 102 as disclosed herein) may be sensed as disclosed herein. In the event that the pouch cell is deformed from above in the orientation of FIG. 10, displacement may be used to press down on a mechanical device installed in the cover of the pouch cell module.

With respect to the examples of FIGS. 7-10, outside the pouch, and in front of the pressure conveying component, the sensing membrane 102 or an optical fiber itself (e.g., without the sensing membrane 102, or in series after the sensing membrane 102) may be placed in a dedicated path (e.g., a groove) as shown in FIGS. 7-10. The sensing membrane 102 may be formed of a coating (e.g., 900 µm buffer) around an optical fiber, or the optical fiber including a coating (e.g., 900 µm buffer) may be disposed in a polyimide ribbon, and circulated among all of the pouches and pouch cell modules. In one example that uses the optical fiber itself, the optical fiber may be spliced in series after the sensing membrane 102 so that the optical fiber may be monitored with the same reflectometer probing the sensing membrane 102. The movement of the protruding pressure pouch or plate may force the optical fiber (or the sensing membrane 102) into a bend that is calibrated, and will be detected as a loss on the reflectometric trace. Different bend amounts may represent different loss types (e.g., a first bend amount may represent a first type of thermal event, a second bend amount may represent a second type of thermal event, etc.). A moderate spatial resolution on the OTDR may be used to detect which pouch cell module has a bulging pouch and take the appropriate preventive action. Different preventive actions may correspond to different bend amounts.

Figure 11:
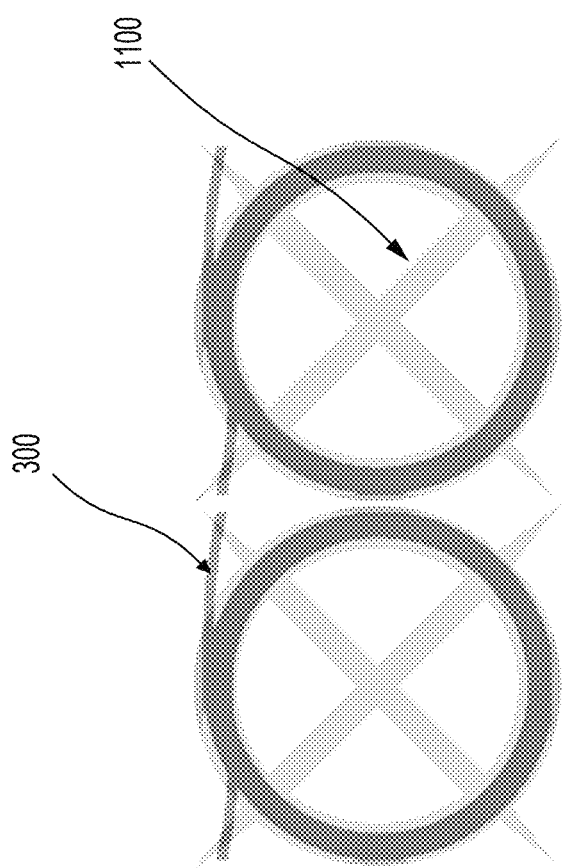
FIG. 11 illustrates a thermal diffuser for utilization with the optical fiber-based sensing membrane of FIG. 1, according to an example of the present disclosure.

FIG. 11 illustrates a thermal diffuser for utilization with the optical fiber-based sensing membrane 102, according to an example of the present disclosure.

Referring to FIGS. 1 and 11, the optical fiber-based sensing membrane 102 may enhance the ability to detect a parameter that may be very localized by conveying that parameter to the fiber location. For example, in the case of detection of a local hotspot with the fiber loop configuration, a thermal diffuser 1100 may be applied to transfer the heat from areas not covered by the fiber (e.g., the optical fibers 300 of FIG. 3). Depending on application constraints, a copper diffuser or a thermally conductive electrically insulating material may be used.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A device comprising:
   a battery pack comprising a first set of battery cells, a second set of battery cells, and a cooling system located between the first set and the second set of battery cells;
   a first optical fiber-based sensing membrane disposed on a first surface of the battery pack to detect a thermal change of the first set of battery cells; and
   a second optical fiber-based sensing membrane disposed on a second surface of the battery pack to detect a thermal change of the second set of battery cells,
   wherein each of the first and second optical fiber-based sensing membranes comprises a substrate and at least one optical fiber integrated in the substrate.

2. The device according to claim 1, wherein the substrate of each of the first and second optical fiber-based sensing membranes includes an adhesive material.

3. The device according to claim 2, wherein the adhesive material is a Polyimide material.

4. The device according to claim 1, wherein the first and second optical fiber-based sensing membranes are further configured to detect mechanical change of the first and second sets of battery cells, including one of strain variations or vibrations.

5. The device according to claim 1, wherein, for each of the first and second optical fiber-based sensing membranes, the at least one optical fiber is configured in a loops pattern or a zig-zag pattern to cover an entire area of the substrate.

6. The device according to claim 1, wherein, for each of the first and second optical fiber-based sensing membranes, the at least one optical fiber and the substrate include a combined thickness of less than approximately 0.5 mm.

7. The device according to claim 1, further comprising:
   a thermal diffuser configured to transfer heat from an area of the device that is not monitored by the first and second optical fiber-based sensing membranes to an area that is monitored by the first and second optical fiber-based sensing membranes.

8. A method comprising:
   providing a battery pack in a device, the battery pack comprising a first set of battery cells, a second set of battery cells, and a cooling system between the first set and the second set of battery cells;
   disposing a first optical fiber-based sensing membrane on a first surface of the battery pack to detect a thermal change of the first set of battery cells; and
   disposing a second optical fiber-based sensing membrane on a second surface of the battery pack to detect a thermal change of the second set of battery cells,
   wherein each of the first and second optical fiber-based sensing membranes comprises a substrate and at least one optical fiber integrated in the substrate.

9. The method according to claim 8, wherein, for each of the first and second optical fiber-based sensing membranes, the substrate includes an adhesive material.

10. The method according to claim 9, wherein the adhesive material is a Polyimide material.

11. The method according to claim 8, wherein the first and second optical fiber-based sensing membranes are further configured to detect mechanical change of the first and second sets of battery cells, including one of strain variations or vibrations.

12. The method according to claim 8, wherein, for each of the first and second optical fiber-based sensing membranes, the at least one optical fiber is configured in a loops pattern or a zig-zag pattern to cover an entire area of the substrate.

13. The method according to claim 8, wherein, for each of the first and second optical fiber-based sensing membranes, the at least one optical fiber and the substrate include a combined thickness of less than approximately 0.5 mm.

14. The method according to claim 8, further comprising:
   providing a thermal diffuser configured to transfer heat from an area of the device that is not monitored by the first and second optical fiber-based sensing membranes to an area that is monitored by the first and second optical fiber-based sensing membranes.

15. A device comprising:
   a battery pack comprising a first set of battery cells, a second set of battery cells, and a cooling system located between the first set and the second set of battery cells;
   a first optical fiber-based sensing membrane disposed on an upper surface of the battery pack to detect a thermal change of the first set of battery cells; and
   a second optical fiber-based sensing membrane disposed on a lower surface of the battery pack to detect a thermal change of the second set of battery cells,
   wherein each of the first and second optical fiber-based sensing membranes comprises a substrate and at least one optical fiber integrated in the substrate, and
   wherein the first and second optical fiber-based sensing membranes are pre-cut adhesive membranes.

16. The device according to claim 15, wherein the pre-cut adhesive membranes include a Polyimide material.

17. The device according to claim 15, wherein, for each of the first and second optical fiber-based sensing membranes, the at least one optical fiber is configured in a loops pattern or a zig-zag pattern to cover an entire area of the substrate.

18. The device according to claim 15, wherein the first and second optical fiber-based sensing membranes are further configured to detect mechanical change of the first and second sets of battery cells, including one of strain variations or vibrations.

19. The device according to claim 15, wherein, for each of the first and second optical fiber-based sensing membranes, the at least one optical fiber and the substrate include a combined thickness of less than approximately 0.5 mm.

20. The device according to claim 15, further comprising:
   a thermal diffuser configured to transfer heat from an area of the device that is not monitored by the first and second optical fiber-based sensing membranes to an area that is monitored by the first and second optical fiber-based sensing membranes.

* * * * *